US007526435B1

(12) United States Patent
Abe et al.

(10) Patent No.: US 7,526,435 B1
(45) Date of Patent: Apr. 28, 2009

(54) INFORMATION OFFERING SYSTEM AUTOMATING REGISTRATION OF ADVERTISEMENT INFORMATION ON HOME PAGES

(75) Inventors: Hiroyuki Abe, Kawasaki (JP); Izumi Muraki, Tokyo (JP); Seiji Yoshizawa, Yokohama (JP); Akitoshi Kaneko, Kawasaki (JP); Kazuaki Tsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1983 days.

(21) Appl. No.: 08/969,342

(22) Filed: Nov. 28, 1997

(30) Foreign Application Priority Data

Jan. 7, 1997 (JP) .................................. 9-013099

(51) Int. Cl.
*G06Q 99/00* (2006.01)
(52) U.S. Cl. ................................ 705/14; 705/50; 705/1
(58) Field of Classification Search .................... 705/14, 705/1, 50, 51, 10, 26, 27
See application file for complete search history.

(56) References Cited

U.S. PATENT DOCUMENTS

| 5,712,979 | A | * | 1/1998 | Graber et al. ............... 709/224 |
| 5,740,549 | A | * | 4/1998 | Reilly et al. .................. 705/14 |
| 5,835,087 | A | * | 11/1998 | Herz et al. ................... 345/327 |
| 5,855,007 | A | * | 12/1998 | Jovicic et al. .................. 705/14 |
| 5,862,325 | A | * | 1/1999 | Reed et al. ............. 395/200.31 |
| 5,933,811 | A | * | 8/1999 | Angles et al. ................. 705/14 |
| 6,029,141 | A | * | 2/2000 | Bezos et al. .................. 705/27 |
| 6,112,192 | A | * | 8/2000 | Capek ......................... 705/14 |
| 6,295,530 | B1 | * | 9/2001 | Ritchie et al. ................. 707/4 |

FOREIGN PATENT DOCUMENTS

| EP | 718 784 | 6/1996 |
| WO | 96/42041 | 12/1996 |

OTHER PUBLICATIONS

Janal, "Market Your Firm Over the Internet" Accounting Technology vol. 12 n. 5 p. 53-56, Jun 1996.*
Hiraiwa et al.; "Info-Plaza: A Social Information Filtering System for the World-Wide Web", Proceedings of the International Conference on Parallel and Distributed Systems, IEEE Computer Society Inc., Jun. 3, 1996, pp. 10-15.

* cited by examiner

*Primary Examiner*—Jalatee Worjloh
(74) *Attorney, Agent, or Firm*—Staas & Halsey LLP

(57) ABSTRACT

An information offering system stores information on products and services along with attributes describing these products and services. Individual users are allowed to automatically register information on their products and services with the information offering system. By this method, the information offering system advertises products and services. Because the registration is done automatically by each offeror of a service or product, the efforts of a central administrator entering this information becomes unnecessary, thus making it possible to advertise more products and services efficiently.

11 Claims, 10 Drawing Sheets

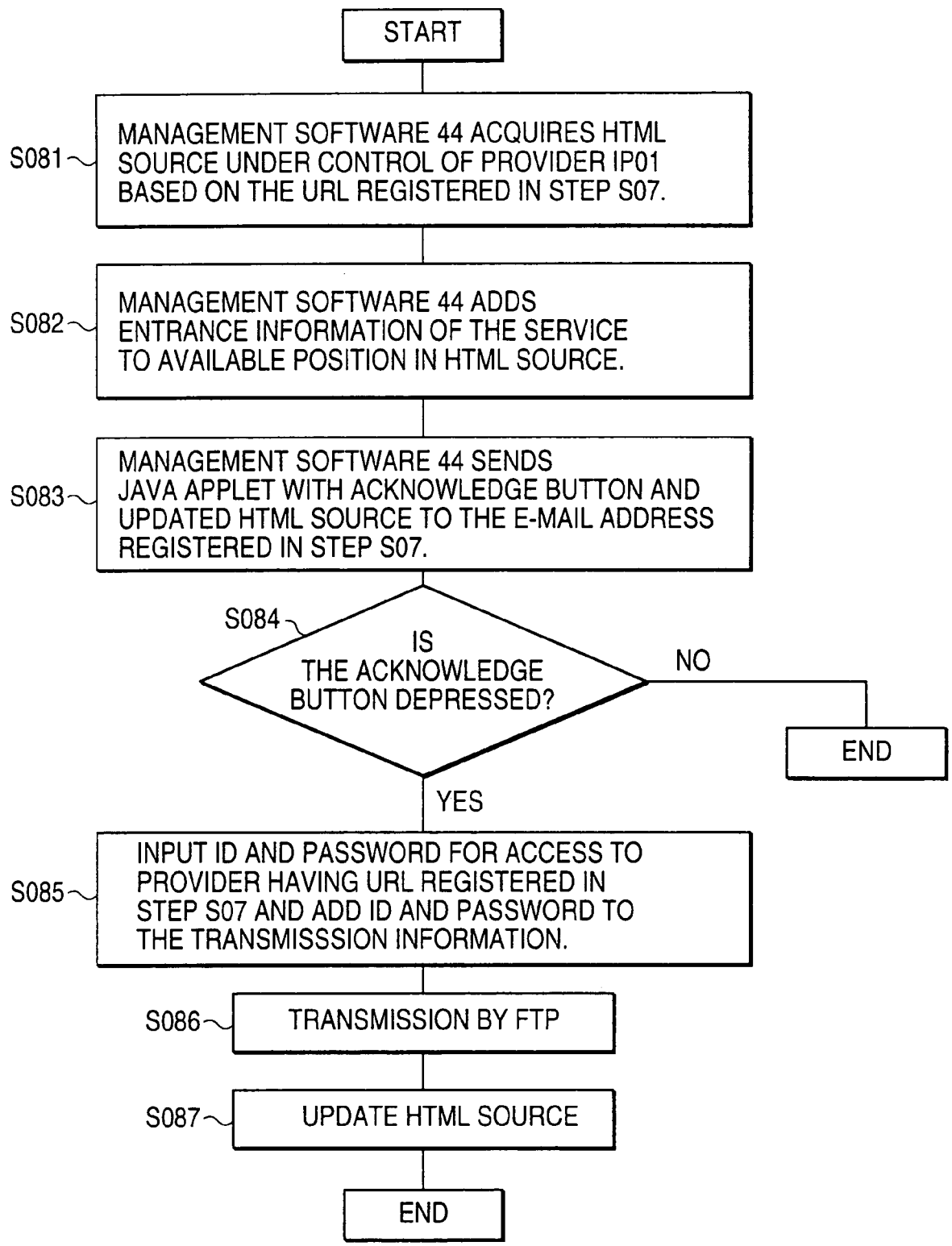

FIG. 4

| SESSION ID | HTTP_REFERER |
|---|---|
| 679002 | http://www.tomato.company-a.co.jp/abc/eggs.htm |
| 679051 | http://www.bacon.company-b.co.jp/cde/lettuce.htm |
| 680075 | http://www.beef.provider-a.or.jp/a01/pc01.htm |
| 680105 | http://www.chicken.provider-b.or.jp/b01/pc15.htm |
| 690013 | http://www.pork.provider-c.org/c01/pc05.htm |
| . . . . | . . . . . . . . . . . . . . |

FIG. 5

SETTING OF ENTRANCE INFORMATION TO HOME PAGE

URL OF HOME PAGE: www.beef.provider-a.or.jp/a01/pc01.htm
KIND OF HOME PAGE: jazz
FIRST NAME: FUJI
SECOND NAME: TARO
E-MAIL: pc01@tomato.provider-a.or.jp

[SUBMIT]

FIG. 6

| MANAGEMENT NO. | REGISTERED URL | ATTRIBUTE | E-MAIL |
|---|---|---|---|
| 0001 | http://www.provider-a.or.jp/a01/pc10.htm | POPS | pc10@tomato.provider-a.or.jp |
| 0002 | http://www.provider-c.org/c01/pc45.htm | BASEBALL | pc45@pork.provider-c.org |
| 0003 | http://www.provider-z.or.jp/z01/pc09.htm | SOCCER | pc09@fish.provider-z.or.jp |
| 0004 | http://www.provider-z.or.jp/z01/pc07.htm | SUMO | pc07@fish.provider-z.or.jp |
| 0005 | http://www.company-A.co.jp/AA01/aa01.htm | BUSINESS | master@hq.company-A.co.jp |
| . . . . | . . . . . . . . . | . . | . . . . . . |

FIG. 8

DO YOU WANT TO ADD THE ENTRANCE INFORMATION TO "SERVICE Z" TO YOUR HOME PAGE?
http://www.beef.provider-a.or.jp/a01/pc01.htm

[YES] [NO]

PLEASE INPUT ID AND PASSWORD FOR MAKING ACCESS TO THE PROVIDER IP01.
ID [        ]
PASSWORD [        ]  [SUBMIT]

FIG. 7A

HOME PAGE OF PC01

WORLD OF JAZZ

· OSCAR PETERSON(p)
· BILL EVANS(p)

FIG. 7B
(URL=http://www.beef.provider-a/a01.pc01.htm)

```
<HTML>
<HEAD>
. . . .
. . . .
<A HREF=" oscar.html"> . .
<A HREF=" bill.html"> . . .
. . . .
</HTML>
```

UPDATE OF SOURCE BY THE SERVER T01

FIG. 7C

```
<HTML>
<HEAD>
. . . .
. . . .
<A HREF=" bill.html">
. . . .
<right>
<a href="http://www.company-z.co.jp/service-z/index.htm" alt=" ff7"><img src=" cgi-bin/entrance. gif" boarder=0></a><right>
</HTML>
```

PART ADDED BY THE SERVER T01

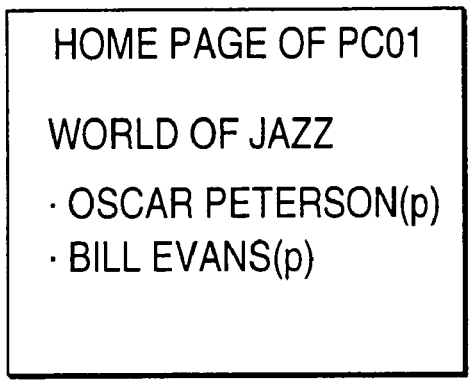
*FIG. 9A*
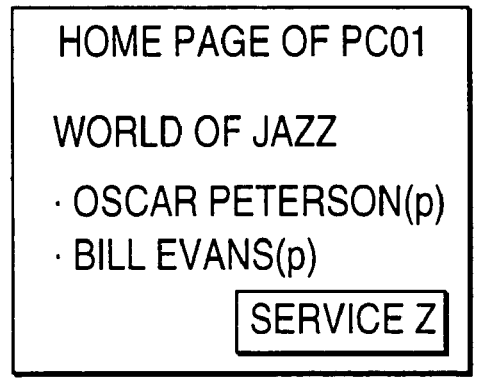
*FIG. 9B*
*FIG. 13*
| GIF FILE | URL AS BRANCHING DESTINATION | KIND OF SERVICE |
|---|---|---|
| entrance.gif | http://www.company-z.co.jp/service-z/index.htm | JAZZ |
| img01.gif | http://www.company-x.com/game/index.htm | GAME |
| . . . . | . . . . . . . . . . . . . . | . . . . |

INFORMATION OFFERING SYSTEM AUTOMATING REGISTRATION OF ADVERTISEMENT INFORMATION ON HOME PAGES

CROSS REFERENCE TO RELATED APPLICATIONS

This application is based upon and claims priority from Japanese Patent Application 9-013099 filed Jan. 7, 1997, the contents of which are incorporated by reference herein.

BACKGROUND OF THE INVENTION

1. Field of the Invention

The present invention relates to an information offering system for providing information or services on a computer network.

2. Description of the Related Art

In recent times, with the rapidly evolving complexity of the Internet, many enterprises, organizations and individual computer users are making available a large amount of information or services, such as sports, business, and leisure, on the networks using their own home pages.

Enterprises and organizations are offering, for the purpose of business or sales promotion, information about self-manufactured products (e.g., contents of games, in the case of a game developing company) and an access window for downloading of self-developed software using their own home pages. Meanwhile, individual users and organizations are offering, using their own home pages, various services, such as information introducing the strategy for newly developed games, forecasting information of horse races or information about a particular hobby.

An ordinary network user having a particular hobby corresponding to a home page of a person or organization, as explained above, in order to get the information about their own hobby, will be interested in accessing home pages related to the hobby. Therefore, there is now a commercial potential for using these home pages as an advertisement medium because ordinary users are beginning to access home pages offering useful information about particular hobbies.

Regarding advertisements on the Internet, it is more effective to place an advertisement, as in advertisements placed in more traditional media, in areas where there are likely to be seen and heard by people who are interested in the information or service appearing in that advertisement.

Accordingly, with the reason explained above, in the case of placing an advertisement for a product or service on the Internet, a person in charge of the company which is planning to place the advertisement makes a survey of all home pages which provide centralized access to information about the product or service to be advertised. Thereafter, the person in charge makes a request by mail or telephone to the owner of such home page to place an advertisement there. In this case, there is no problem when the person in charge of the company is familiar with information about the product or service and he can identify the home page having the highest access rate related to the product or service of concern.

However, if the person in charge is not familiar with the relevant information, it is a very difficult for him to identify a home page having a high access rate. In addition, even when he has some knowledge about the relevant information, it is difficult to identify desirable home pages, because retrieving software on the Internet often retrieves home pages that cannot be used. Moreover, it is essential to register the uniform resource locator (URL) of a home page along with the attribute of the home page for it to be possible for the home page to become retrievable by the retrieving software. Furthermore, personal home pages are often not registered.

Therefore, using the currently existing methods, the success of advertisements on the Internet has been a consequence mainly of the amount of work done by the administrator in charge of the company placing the advertisement. Consequently, it has been difficult to increase the number of places advertisements are displayed.

An advertisement on the Internet is formed of digital information making it possible to distribute such information through the network. Therefore, it is also possible to increase such advertisements by storing the advertisements in a server on the Internet. Namely, if it is possible for an Internet user who has made access to a home page on a server to register an advertisement for display on the user's own home page, the workload of the person responsible for getting the advertisements displayed can be reduced.

Moreover, as explained previously, a user who has accessed a particular home page may be interested in an attribute of that home page. Therefore, if viewing of an advertisement on the Internet can be increased among those having a particular hobby, the company can further reduce the work involved in Internet advertising, resulting in more efficient advertising. However, to increase distribution of advertisements, it is necessary to give an incentive to users to register their home pages to encourage them to register an advertisement pointing to a company's home page.

On the other hand, presentation of the advertisement in a home page requires revision of the contents of the home page. Although a personal home page is hosted by a server of an Internet service provider, the Internet service provider cannot freely revise the contents of the home page. Therefore, it is essential to get approval of the owner of the home page, because such revision is allowed only by the owner of the home page. Since revision of a personal home page will require access to the server of the Internet service provider, at least the communication ID and password for establishing communication with the Internet service provider are required.

SUMMARY OF THE INVENTION

The first object of the present invention is to provide an information offering system on a computer network which allows an information offeror to register and update a home page.

The second object of the present invention is to provide an information offering system on a computer network for allowing a user to access a home page from an advertisement by branching or linking to the location of the home page.

To achieve the first object, the information offering system of the present invention for providing offered information on a computer network comprises a memory unit to store entrance information about entrance to the offered information, an input accepting unit to accept input of identification information for display information and permission to add the entrance information to the display information by an offeror of the display information and an update unit to update the display information identified by the identification information to include the entrance information when permission is received by the input accepting unit.

Moreover, to achieve the second object, the information offering system of the present invention for providing offered information on a computer network comprises a memory unit to register identification information about display information together with attributes of the display information and a branching unit to branch, upon reception of a desired branch instruction, to generation of desired information based on the identification information in the memory unit, routing information indicating routing to the information offering system, and the attributes stored in the memory unit.

BRIEF DESCRIPTION OF THE DRAWINGS

FIG. 3 is a flowchart of setting the entrance information for the home page.

FIG. 4 is a data management diagram of the session ID and routing information.

FIG. 5 is a display of setting the entrance information.

FIG. 6 is a data format diagram of the registered database for management of Earliest.

FIG. 7A is a display of a home page on PC01 prior to updating to show entrance information.

FIG. 7B is HTML source that generates the display in FIG. 7A.

FIG. 7C is updated HTML source after the addition of the entrance information to the HTML source illustrated in FIG. 7B by the management software 44.

FIG. 8 is a display example on personal computer PC01 having received a JAVA applet.

FIG. 9A is a display of the home page before setting of the entrance information.

FIG. 9B is a display of the home page after setting of the entrance information.

FIG. 13 is a data format diagram of the database for administrating the entrance information.

DESCRIPTION OF THE PREFERRED EMBODIMENTS

Figure 10:
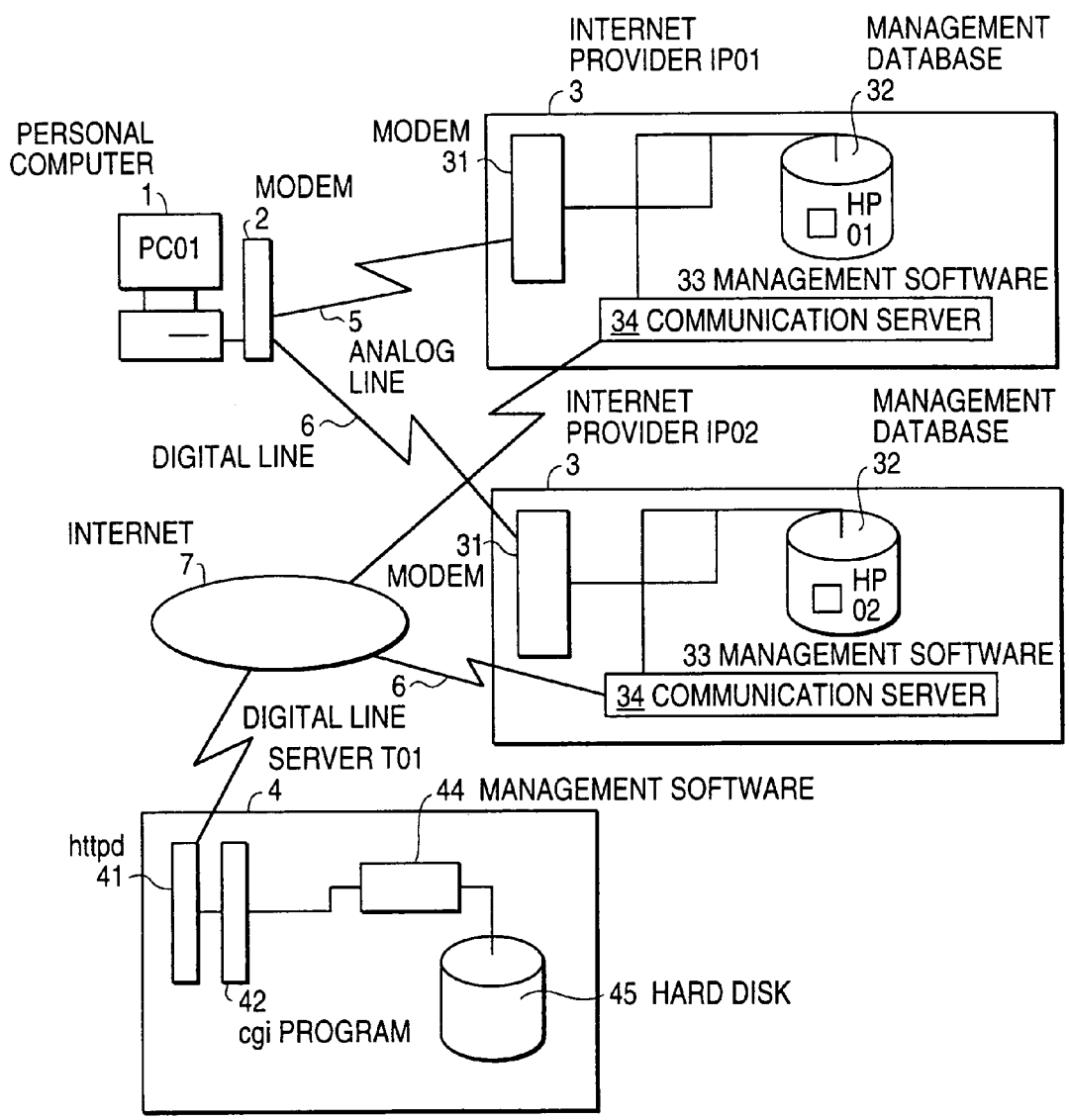
FIG. 10 is a system configuration diagram of the second embodiment of the present invention.
Figure 11:
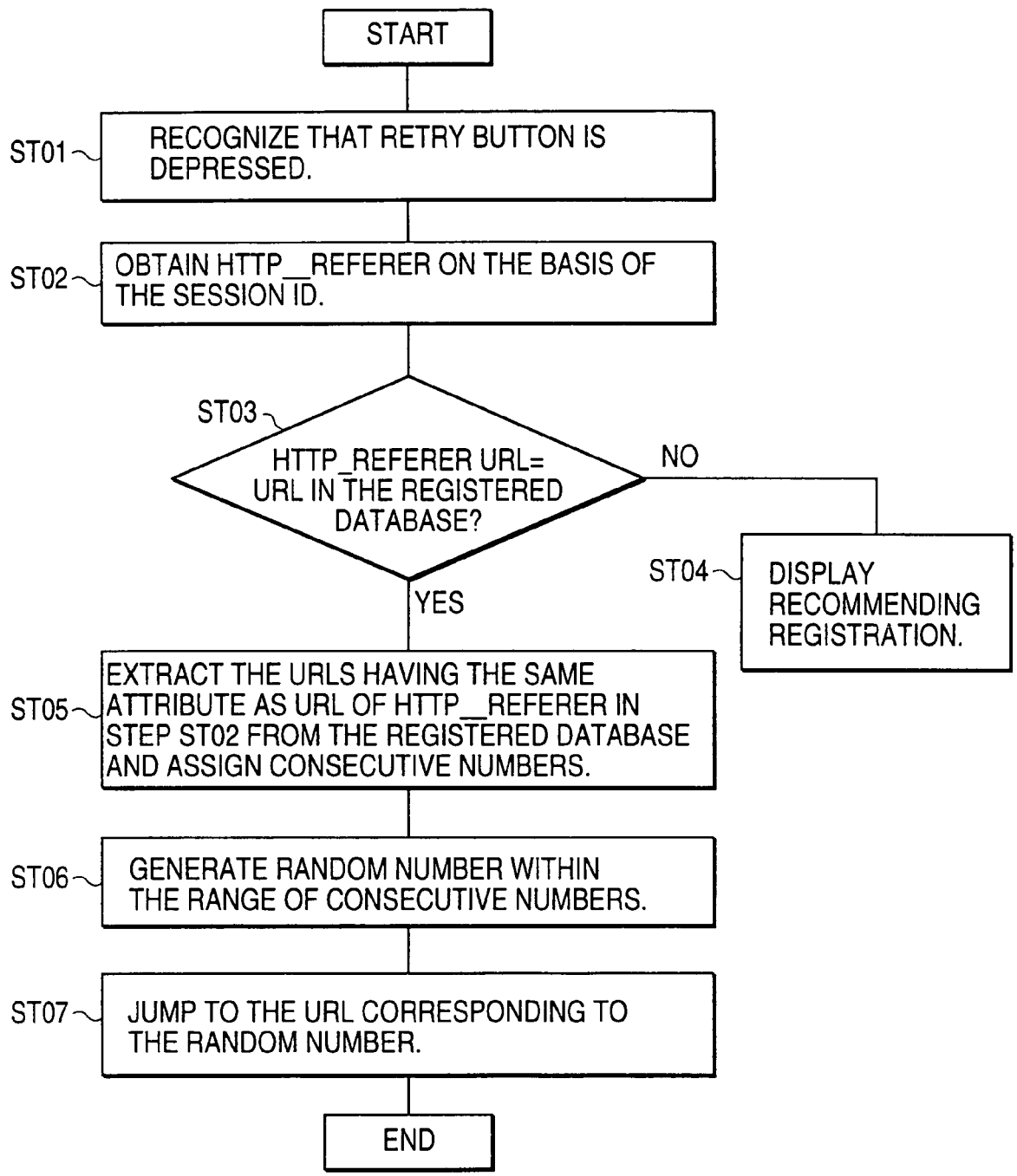
FIG. 11 is a flowchart of the third embodiment of the present invention.
Figure 12:
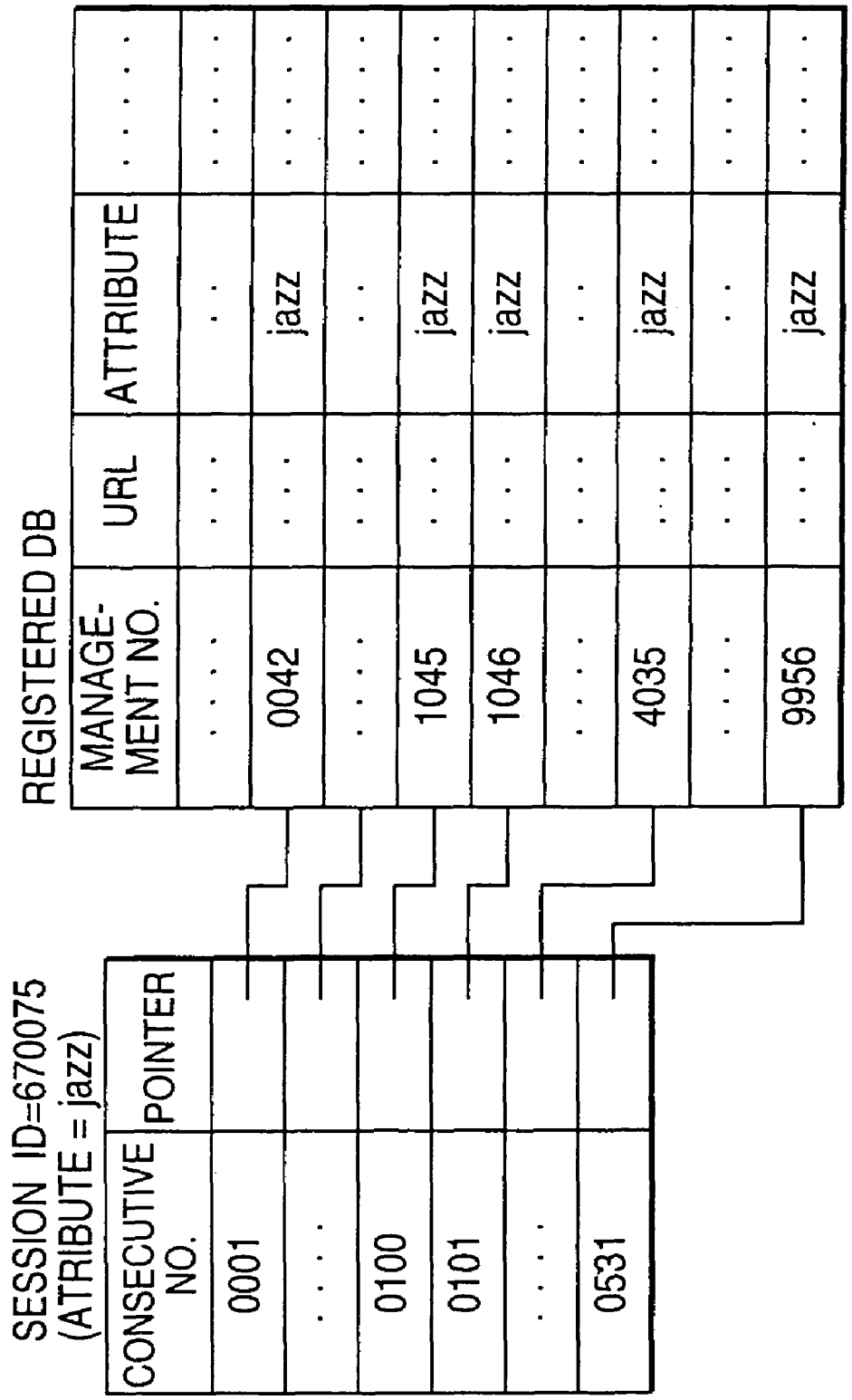
FIG. 12 is a data format diagram of the database for administrating the extracted URL.

Preferred embodiments of the present invention will be explained hereunder with reference to FIGS. 1-12. FIGS. 1-9 illustrate the first preferred embodiment of the present invention. FIG. 10 illustrates the second preferred embodiment of the present invention. FIGS. 11 and 12 illustrate the third embodiment of the present invention.

Figure 1:
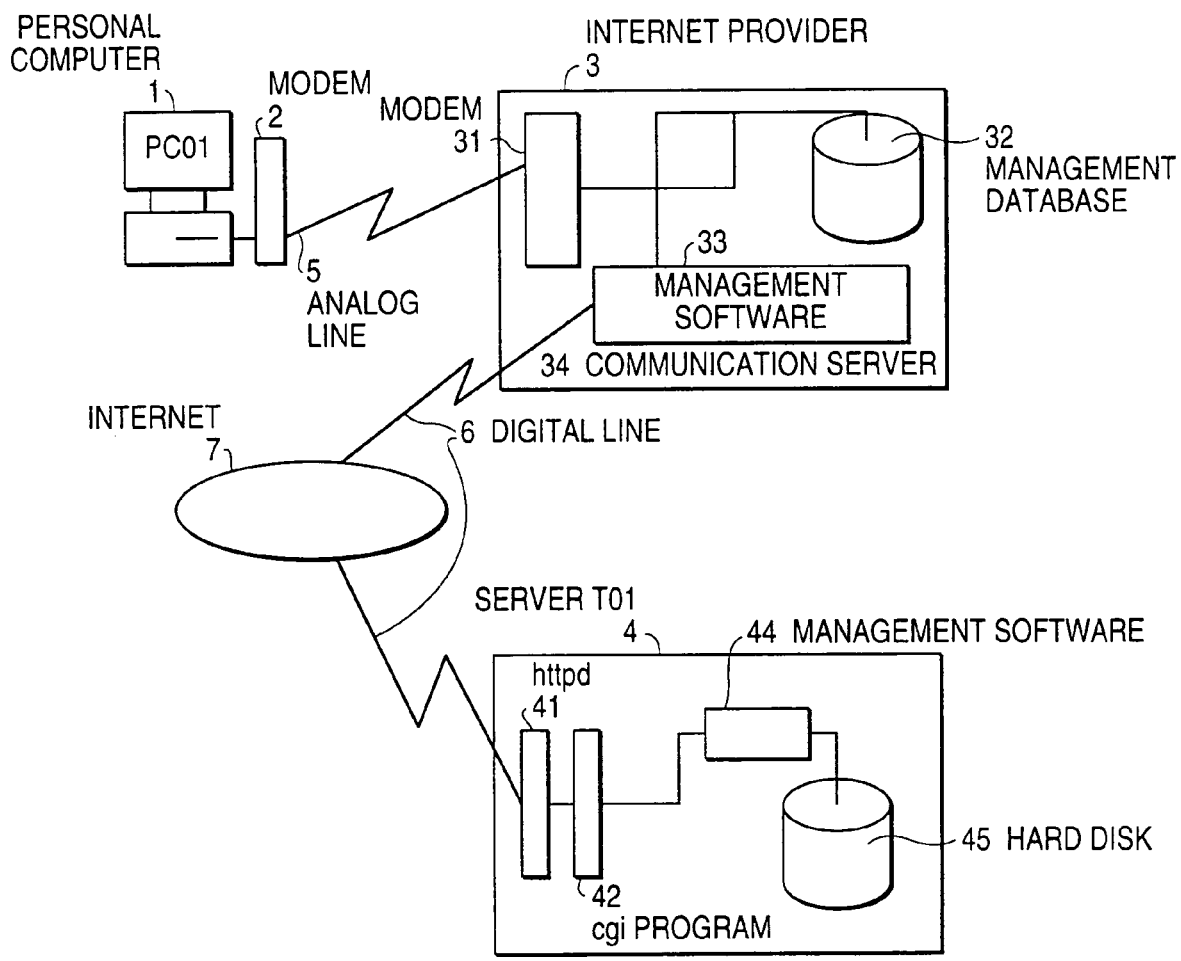
FIG. 1 is a system configuration diagram of the first embodiment of the present invention.

The first embodiment of the present invention will be explained with reference to FIGS. 1-9. FIG. 1 shows a system configuration in relation to the first embodiment of the present invention. As illustrated in FIG. 1, a personal computer 1 (PC01) is connected by a modem 2 and an analog line 5, such as a telephone line, to a server 3 (IP01) of an Internet service provider. In FIG. 1, the modem 2 is illustrated in a housing separate from the housing of personal computer PC01, i.e., as an external modem, but the modem 2 may be in the same housing as personal computer 1 (PC01), i.e., the modem 2 may be an internal modem. Alternatively, the connection between personal computer 1 and the server 3 (IP01) may be by a digital line, such as an ISDN line and appropriate interfaces, such as terminal adapters. The server 3 (IP01) of the Internet service provider is connected to the server 4 (T01) for offering information or service via the digital lines 6 (e.g., ISDN line) and Internet 7.

The server 3 (IP01) is generally composed of a modem 31 for communication with the analog lines, a management database 32 for administrating personal home pages and member information, management software 33 for controlling or administrating accesses by members of the Internet service provider using information of the management database 32 and a communication server 34 for mediating accesses to the Internet from the members of the Internet service provider.

On the other hand, the server 4 (T01) is composed of an http demon (httpd) 41 and cgi program 42. The http demon administrates the server T01 by a routine which accepts an http request from a user and controls the server system indirectly based on the user request which should not be controlled indirectly by a user. Moreover, common gateway interface (cgi) program 42 is a program having a cgi for providing various services responding to the requests from users. In the following examples, the methods of the present invention are performed by the management software 44 and the hard disk 45.

Figure 2:
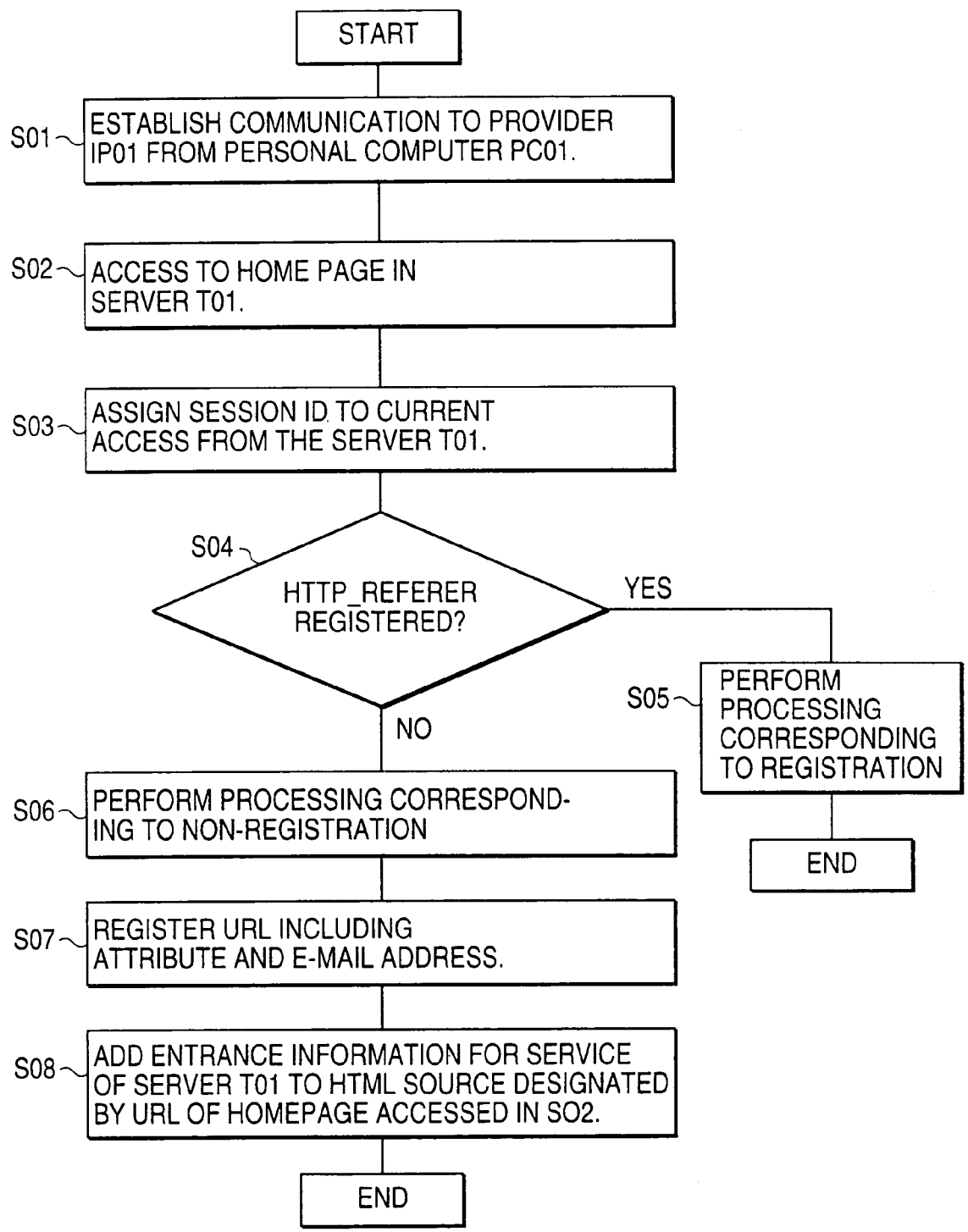
FIG. 2 is a flowchart of the first embodiment.

Operations of the present invention will be briefly explained conforming to the flowchart in FIG. 2. A particular example explained below is the case where an owner of personal computer PC01 sets the entrance information of a service Z offered from the server T01 to his own home page, i.e., display information under the control of the Internet service provider IP01. The following steps refer to FIG. 2.

In step S01, the communication ID and password are transmitted to the server 3 (IP01) of the Internet service provider from personal computer 1 (PC01) to establish communication between the server 3 and personal computer 1.

In step S02, the home page in server 4 is accessed after searching various home pages via server 3 of the Internet service provider. At the time of access, personal computer 1 (PC01) transmits to the server 4 (T01) the variable HTTP_REFERER indicating through which server the access was made to server 4 (T01). For example, as shown in FIG. 4, when personal computer 1 (PC01) has accessed server 4 (T01) from the home page designated by "http://www.beef-.provider-a.or.jp/a01/pc01.htm", this URL is substituted into the variable HTTP_REFERER which is then transmitted to the server 4 (T01). In this example, the variable HTTP_REFERER indicates the home page of the owner of personal computer 1 (PC01).

In step S03, the management software 44 assigns a session ID for identifying communication to administrate this access of personal computer 1 (PC01). The browser of personal computer 1 (PC01) sends the session ID before the session ends. In the example shown in FIG. 4, "680075" is the session ID and it is administrated together with the variable HTTP_REFERER received in step S01. The communication of personal computer 1 (PC01) can be discriminated from communication having other session IDs by transmitting the relevant session ID to the server T01 during the session. For example, the management software 44 in the server T01 assigns the session ID for the session of personal computer 1 (PC01), and sends the session ID to personal computer 1 (PC01). So, when the browser of personal computer 1 (PC01) sends an order (e.g., branching to a page of FIG. 5), the browser sends the order with the session ID to the server T01.

In step S04, the management software 44 determines whether HTTP_REFERER is registered in the registered database (see FIG. 6). In other words, the management software 44 determines whether the URL of the home page on server T01 stored in the variable HTTP_REFERER exists in the registered database (FIG. 6). The information shown in FIG. 6 is administrated in the hard disk 45. For instance, in FIG. 6, the URL corresponding to the management number 0001 is "http://www.provider-a.or.jp/a01/pc10.htm". The contents of the home page relates to "POPS". The record with management number 0001 also has an e-mail address of "pc10@tomato.provider-a.or.jp" for the owner of the home page. The owner of a home page is a person who can authorize revision of the contents of the home page. Contents of the registered database of FIG. 6 are based on the contents of input at the preset display of the entrance information to the home page shown in FIG. 5 (explained later).

In step S05, when access is made from a home page that is already registered, branching is made to contents corresponding to access from a home page registered in the database. The contents corresponding to registration are, for example, premium contents for the person who has accessed from a home page which is already registered.

In step S06, when access is made from a home page not yet registered, the method branches to contents corresponding to access from an unregistered home page. Below it will be assumed that the variable HTTP_REFERER corresponding to the session ID "680075" of PC01 is explained under the assumption that it is not yet registered in the registered database illustrated in FIG. 6.

In step S07, the method proceeds to the display for recommending registration. As illustrated in FIG. 5, the display for registering the URL of the home page sets the entrance information to a service Z, its attribute (for example, a kind of service such as baseball, soccer, etc.) and an e-mail address or other destination information of the home page owner (namely, a person who can revise the source of the home page). The registered information is assigned a unique management number and is then stored in the registered database (FIG. 6) on the hard disk 45.

In other words, in the display of FIG. 5, the owner of personal computer PC01 registers the required-items for registering the entrance information of a service Z to his own home page. In FIG. 5, the URL "http://www.beef.provider-a.or.jp/a01/pc01.htm" of the owner of PC01, the attribute "jazz", and the e-mail address of the owner of the home page, "pc01@tomato.provider-a.or.jp" and the other items are written. Thereafter, the "Submit" button is clicked to transmit the contents to the server T01.

In step S08, the management software 44 acquires the relevant source in HTML format from an area within the server (IP01) designated by the URL via the digital line 6 and Internet 7 and adds the entrance information of a service Z to the source acquired (corresponding to FIG. 3 and FIGS. 7A-7C, explained later). Thereby, registration of the entrance information by a third party eases the work load of the person in charge of the company offering service Z, i.e., offered information about a service or product, where the entrance information provides a link to the offered information.

Next, modification of a home page to add entrance information to the service Z on the server IP01 will be explained with reference to FIG. 3 (corresponding to step S08 of FIG. 2).

In step S081, the management software 44 acquires the HTML source in the management database 32 of the Internet service provider IP01 via the digital lines 6 and Internet 7, based on the URL "http://www.beef.provider-1.or.jp/a01/pc01.htm" registered in step S07 of FIG. 2. An example of the HTML source acquired corresponds to the HTML source in FIG. 7B. The HTML source does not yet have the entrance information to the service Z. FIG. 7A is a display of the home page produced by an Internet browser using the HTML source before update illustrated in FIG. 7B.

In step S082, the management software 44 adds entrance information for the service Z to the HTML source acquired from server 3. FIGS. 7A-7C indicate how the management software 44 adds the entrance information of service Z to the HTML source. The management software 44 having acquired the relevant HTML source retrieves the entrance information having the same service type as that input in step S07 from the entrance information database (FIG. 13) in the hard disk 45. The entrance information is added to the HTML source at a position that does not obliterate any existing contents of the display generated by the HTML source. This is easily accomplished since there is no limit to the length of the display generated by the HTML source and the area of the display containing visible images can be determined by the management software 44. Alternatively, the owner of the home page generated by the HTML source may designate an area for advertisements to be displayed.

FIG. 13 shows the structure of the entrance information database for administrating the entrance information in the hard disk 45. The entrance information database as shown in FIG. 13 stores the name of a GIF file (image file) playing the role of a button for the entrance information, the URL of the branching destination when the button is clicked and a type of service.

In this example, since the service type "jazz" is input in step S07, the management software 44 reads the record for that type of service from the entrance information database (FIG. 13), including that the GIF file is "entrance.gif". The management software 44 updates the HTML source acquired in step S081 as shown in FIG. 7C on the basis of the record read from the entrance information database.

Namely, the management software 44 adds the entrance information to the HTML source to provide a link to the URL of the record read from the entrance information database, together with a tag (corresponding to <right> in the example of FIG. 7C) indicating where to insert the entrance information. In the example of FIG. 7C, the entrance information is set at the right end before tag </HTML>) of the source acquired. The HTML statements added by the server T01 means that it jumps to the URL following the "a ref=", when the image file designated by the URL following "img src=" is clicked. When the entrance information is added at the left side, the tag <left> is added to the HTML source, and when added at the center, the tag <center> is added.

In step S083, the management software 44 adds the acknowledge button to the updated HTML format source (in this example, corresponding to the source after update in FIG. 7C), and transmits it to the e-mail address with a JAVA applet (trademark of Sun Microsystems, U.S). The JAVA applet is a program which transmits the advertisement information added to the HTML format source using the Internet file transfer protocol (ftp) to the URL acquired in step S07 of FIG. 2 (display of FIG. 5), when the acknowledge button is clicked.

In this example, since only one corresponding entrance information is assumed in step S082, only one acknowledge button is given. However, in general, two or more corresponding items of entrance information may exist in step S082. Therefore, on the occasion of setting several items of entrance information, an acknowledge button may be provided for each entrance information or a simultaneous acknowledge button to set all entrance information may be provided.

In step S085 of FIG. 3, the JAVA applet requests input of the communication ID and password for making access to the Internet service provider IP01. Input of the communication ID is not always requested when HTTP_REFERER matches the URL to be updated as in the case of the first embodiment. In this case the communication between personal computer PC01 and the Internet service provider IP01 is already established (S01 of FIG. 2) and the communication ID and password for the service provider are already input. Input of the communication ID, etc. is required, as in the case of the second embodiment explained later, when HTTP_REFERER and the URL to be updated belong to different servers.

When the acknowledge button is not depressed at step S084, the JAVA applet terminates the process. Therefore, the HTML source updated in the management software 44 is not reflected on the management database 32.

In step S085, the JAVA applet described above adds, when the "Submit" button in the dialog box of FIG. 8 is clicked, the communication ID and password input in the same dialog box to the updated HTML source.

In step S086, the JAVA applet transmits the HTML source with advertisement information added, by ftp to the URL acquired in step S07 of FIG. 2 (display of FIG. 5) with the communication ID and the password.

In step S087, the management software 33 in server 3, having received the transmission information from personal computer 1, confirms the right to revise the home page by checking the communication ID and password and thereafter updates the HTML source by overwriting the HTML statements to add the entrance information for the service Z.

FIGS. 9A and 9B show the home page of the owner of PC01 as displayed by an Internet browser before (FIG. 9A) and after (FIG. 9B) the setting of the entrance information to the service Z. In FIGS. 9A and 9B, the difference between the home page before and after the setting of the entrance information is the addition of the image file indicating entrance to the service Z located at the lower right of the home page illustrated in FIG. 9B. This difference corresponds to the HTML statements added by the server T01 in FIG. 7C. The entrance button to the service Z in FIG. 9B corresponds to the image "cgi-bin/entrance.gif" of FIG. 7C.

Here, the routing through its own home page has been explained above, but routing through the home page of another user is also possible. In this case, it is necessary to previously obtain the destination of the home page owner (e-mail address) from the information about the relevant home page. In the display shown in FIG. 5, the URL of the home page of a user other than the owner and the e-mail address of the owner of the home page are obtained, so that a user wishing to revise another's home page can get permission from the other user.

FIG. 10 shows a system configuration in relation to the second embodiment of the present invention. The elements of FIG. 10 having the same reference numerals as FIG. 1 are identical to the elements of FIG. 1. In FIG. 10, the owner of personal computer PC01 has contracted with a plurality of Internet service providers (e.g., IP01, IP02) and the owner of personal computer PC01 makes access to the server T00 via the Internet service provider IP01 to revise the home page HP02 in the management database 32 of the Internet service provider IP02. Namely, in FIG. 10, HTTP_REFERER is different from the URL of the home page which is the object of update.

In FIG. 10, the owner of personal computer PC01 can receive the service Z offered by the server T01 having installed the software in relation to the present invention via the owner's home page HP02 or the home page of another person under the control of the Internet service provider IP02. The entrance information to the service Z is set to the home page HP01 of the owner of PC01 under the control of the Internet service provider IP01.

This case is basically the same as explained above in regard to the first embodiment of the present invention. Therefore, the session ID and HTTP_REFERER (routing information) are administrated in the hard disk 45 in the server T01 as shown in FIG. 4 and the registered URL, etc. is also administrated as shown in FIG. 6.

However, this case is different from the first embodiment in that the URL of the home page HP02 under the control of the Internet service provider IP02 is stored as the routing information in HTTP_REFERER. Furthermore, the URL of home page HP01, input at the setting display of FIG. 5 as the identification information for the display information (home page HP01) to which the entrance information will be added, is under control of the Internet service provider IP01.

Another difference is that the second embodiment requires input of a communication ID and password when the source of the updated home page HP01 is received together with the JAVA applet (FIG. 8). In this case, since personal computer PC01 is accessing the server T01 via the Internet service provider IP02, communication with the Internet service provider IP02 has already been established. However, the source of the updated home page HP01 is under the control of Internet service provider IP01 to which communication is not yet established. Therefore, in this case, as shown in FIG. 8, input of the communication ID and password required for accessing the Internet service provider IP01 must be obtained. In this regard, the second embodiment is different from the first embodiment. In the first embodiment, it is not necessary to input a communication ID because communication with service provider IP01 has already been established. By contrast, in the second embodiment, it is necessary to input a communication ID because communication with Internet service provider IP01 has not been established.

Otherwise, the second embodiment is similar to the first embodiment already explained. In FIG. 10, the home page HP02 used for routing is designated as a personal home page under the control of the Internet service provider for the purpose of this explanation, but it is of course possible that the routing home page may be a home page offered by a company or organization on the server IP02. In addition, in FIG. 10, the home page HP01 in which the entrance information is set has been described as a personal home page under the control of the Internet service provider for the convenience of explanation, but it is also of course possible that a home page offered by a company or organization having a server could be used.

FIG. 11 shows a flowchart for explaining operations of the third embodiment of the present invention. The system configuration used in the third embodiment may be any system configuration, including as shown in FIG. 1 or FIG. 10. However, operations of the third embodiment will be explained using the reference numerals appearing in the system configuration of FIG. 1 and contents of FIGS. 2-9.

In the third embodiment of the present invention, persons viewing the home page displaying the entrance information for the service can easily link to multiple URLs with the same attribute as that of the routing information, when the management software 44 has received an instruction to provide such links during access to the home page under the control of the server T01. In this embodiment, since the links are easily accessed, this will encourage more users to access home pages on related subject matter. Meanwhile, it is preferable for those who have issued a request to link to another home page, i.e., a free branching instruction, because the link or branching is made, based on the routing information, to a home page with information in which the person who issued the command is interested. Therefore, the person who issued the command may find his or her expectation fulfilled and something new may be found.

In step ST01 the home page under the control of the server T01 is provided with a "retry button" at a desired position to issue a free branching instruction to branch to randomly selected related information. When the owner of personal computer PC01 transmits an instruction to the server T01 by clicking the "retry button" on the display, the management software 44 recognizes issuance of the free branching instruction.

In step ST02, the management software 44 obtains the routing information of the relevant session from the management data shown in FIG. 4 on the basis of the session ID given to this session. For example, when the session ID is "680075", the management software 44 obtains the routing information "http://www.beef.provider-a.or.jp/a01/pco1.htm".

In step ST03, the management software 44 judges whether the routing information obtained from the registered database (FIG. 6) matches the routing information in step ST02. When the routing information obtained in step ST02 does not match the routing information from the registered database, in step ST04 the management software 44 branches to a display recommending registration.

When it is determined in step ST03 that the routing information obtained in step ST02 matches the routing information in the registered database, in step ST05 the management software 44 extracts routing information from the registered database having the same attribute as the routing information (URL) previously obtained from the registered database. The management software 44 assigns consecutive numbers for the routing information (URLs) extracted from the registered database and uses a work database on the hard disk 45 to maintain pointers to entries in the registered database that have the same attribute.

FIG. 12 shows an example of management of the work database created in response to clicking on the "retry button" when the attribute is "jazz." The work database on the left side of FIG. 12 is created for each session (in this case session ID "670075") in which the retry button is clicked. Each entry in the work database corresponds to an entry in the registered database with an attribute that matches the attribute in the registered database record containing the URL in HTTP_REFERER. The work database is composed of consecutive numbers used for management and pointers to the records of the registered database (FIG. 6) having matching attributes.

In step ST06 the management software 44 generates a random number within the range of consecutive numbers of the work database. In the example of FIG. 12, the random number is generated within the range from 1 to 531, because the number of records in the work database, i.e., the number of records in the registered database with the attribute "jazz" (excluding the record with URL in HTTP_REFERER, "http://www.beef.provider-a.or.jp/a01/pc01.htm"), is 531.

In step ST07 the management software 44 uses the random number generated in step ST06 to identify a URL pointed to by the work database record having a consecutive number corresponding to the random number. The management software 44 also transmits HTML source indicating a jump to the URL associated with the session ID ("680075"). Thereafter, the management software 44 deletes the management data (FIG. 4) for the session ID ("680075"). The Internet browser running on personal computer 1 receives and executes the HTML source and jumps to the designated URL.

In the first embodiment, an advertisement may be set in the home page on the server of a company via the company LAN. Moreover, in the second embodiment, it is also possible that a user sets the entrance information to his own home page under the control of an Internet service provider via the company LAN.

In the above explanation, the present invention is installed on the system, but the present invention may also be embodied as instructions on a memory medium before it is installed on the system. In this case, the memory medium includes a unit corresponding to the management software 44 explained above. However when the memory medium is installed on the system, the system is equivalent to that explained above. Therefore the same explanation is not repeated here.

As will be apparent from above disclosure, the present invention provides the following benefits.

First, since the entrance information can be registered by the third party having the home page, the burden on the service offeror will be eased because the work is shared for expanding the entrance information.

Second, since branching to the home page can be made easily, references thereto are likely to increase and consequently the access rate can be improved. Accordingly, advertisements on the Internet can be increased by giving incentive for opening of the home page.

What is claimed is:

1. A server computer for managing advertisement information, comprising:
    a registration database unit to store identifiers of network resources having entrance information to access said server computer;
    a receiver unit to receive a linking network resource identifier for a specified network resource from which access has been made to said server computer;
    a determination unit to determine whether the linking network resource identifier is stored in said registration database unit;
    a recommendation unit to make a recommendation that an owner of the specified network resource set the entrance information in the specified network resource when the linking network resource identifier is not stored in said registration database unit and to supply the entrance information when the recommendation is accepted; and
    a providing unit to provide advertisement information corresponding to the entrance information upon request by a user who has accessed one of the network resources for which a corresponding identifier is stored in said registration database unit.

2. A server computer according to claim 1,
    wherein said registration database unit further stores at least one attribute for each of the network resources stored therein, and
    wherein said providing unit selects corresponding advertisement information based on the at least one attribute stored with the corresponding identifier.

3. A server computer according to claim 2, further comprising:
    a registration unit to register an address of the owner of the specified resource identified by the linking network resource identifier when the recommendation is accepted; and
    an approval unit to send a revised network resource to the address of the owner to obtain approval of the revised network resource by the owner.

4. A server computer according to claim 3, wherein the address is an e-mail address.

5. A server computer according to claim 2, further comprising:
    a management unit to manage accesses by users to said server computer via the identifiers for the network resources stored in said registration database unit; and an activation unit to activate said management unit when routing information from a consumer computer has not been registered by said registration database unit.

6. A server computer coupled to at least one consumer computer, comprising:
   a receiver unit to receive a consumer network resource identifier derived from routing information sent by a first consumer from a first consumer computer;
   a registration database unit to store registered network resource identifiers and attribute information corresponding thereto;
   a determination unit to randomly determine a selected network resource identifier stored in said registration database unit having a stored attribute matching a consumer attribute of the consumer network resource identifier; and
   a sender unit to send to a second consumer computer of a second consumer an order to jump to the selected network resource identifier.

7. At least one computer readable storage medium storing at least one computer program to control a computer to perform a process comprising:
   storing in a registration database identifiers of network resources having entrance information to access a server computer;
   receiving a linking network resource identifier for a specified network resource from which access has been made to the computer;
   determining whether the linking network resource identifier is stored in the registration database;
   making a recommendation that an owner of the specified network resource set the entrance information in the specified network resource when the linking network resource identifier is not stored in the registration database;
   supplying the entrance information when the recommendation is accepted; and
   providing advertisement information corresponding to the entrance information upon request by a user who has accessed one of the network resources for which a corresponding identifier is stored in the registration database.

8. At least one computer readable storage medium as recited in claim 7, wherein the process further comprises:
   registering at least one attribute for each of the network resources stored in the registration database, and
   selecting the advertisement information which is provided based on the at least one attribute stored with the corresponding identifier.

9. At least one computer readable storage medium storing at least one computer program to control a computer to perform a process comprising:
   receiving a consumer network resource identifier derived from routing information sent by a first consumer from a first consumer computer;
   storing in a registration database registered network resource identifiers and attribute information corresponding thereto;
   randomly determining a selected network resource identifier stored in the registration database having a stored attribute matching a consumer attribute of the consumer network resource identifier; and
   sending to a second consumer computer of a second consumer an order to jump to the selected network resource identifier.

10. A method for managing advertisement information, comprising:
    storing in a registration database identifiers of network resources having entrance information to access a server computer;
    a receiver unit to receive a linking network resource identifier for a specified network resource from which access has been made to said server computer;
    determining whether the linking network resource identifier is stored in the registration database;
    making a recommendation that an owner of the specified network resource set the entrance information in the specified network resource when the linking network resource identifier is not stored in the registration database;
    supplying the entrance information when the recommendation is accepted; and
    providing advertisement information corresponding to the entrance information upon request by a user who has accessed one of the network resources for which a corresponding identifier is stored in the registration database.

11. A method for controlling a server coupled to at least one consumer computer comprising:
    receiving a consumer network resource identifier derived from routing information sent by a first consumer from a first consumer computer;
    storing in a registration database registered network resource identifiers and attribute information corresponding thereto;
    randomly determining a selected network resource identifier stored in the registration database having a stored attribute matching a consumer attribute of the consumer network resource identifier; and
    sending to a second consumer computer of a second consumer an order to jump to the selected network resource identifier.

* * * * *